US010935161B2

(12) United States Patent
Junk et al.

(10) Patent No.: US 10,935,161 B2
(45) Date of Patent: Mar. 2, 2021

(54) CONTROL VALVE WITH GUIDE VANE

(71) Applicant: FISHER CONTROLS INTERNATIONAL LLC, Marshalltown, IA (US)

(72) Inventors: Kenneth W. Junk, Marshalltown, IA (US); Paul T. Alman, Marshalltown, IA (US)

(73) Assignee: FISHER CONTROLS INTERNATIONAL LLC, Marshalltown, IA (US)

( * ) Notice: Subject to any disclaimer, the term of this patent is extended or adjusted under 35 U.S.C. 154(b) by 42 days.

(21) Appl. No.: 15/708,735

(22) Filed: Sep. 19, 2017

(65) Prior Publication Data

US 2019/0086000 A1 Mar. 21, 2019

(51) Int. Cl.
| F16K 47/04 | (2006.01) |
| F16K 3/24 | (2006.01) |
| F16K 47/08 | (2006.01) |
| F16K 27/02 | (2006.01) |
| F16K 27/04 | (2006.01) |
| F16K 1/52 | (2006.01) |

(52) U.S. Cl.
CPC .............. *F16K 47/04* (2013.01); *F16K 3/246* (2013.01); *F16K 27/02* (2013.01); *F16K 27/041* (2013.01); *F16K 47/08* (2013.01); *F16K 1/52* (2013.01)

(58) Field of Classification Search
CPC .......... F16K 47/04; F16K 47/08; F16K 27/02; F16K 27/041; F16K 3/246; F16K 1/52
See application file for complete search history.

(56) References Cited

U.S. PATENT DOCUMENTS

| 630,315 | A | * | 8/1899 | Barclay | ................... F16K 47/08 251/127 |
| 2,685,426 | A | * | 8/1954 | MacGregor | ............... F16K 1/10 251/118 |
| 4,397,331 | A | * | 8/1983 | Medlar | ................... F16K 47/02 137/375 |
| 4,506,860 | A | * | 3/1985 | von Schwerdtner | ....................... F01D 17/145 251/118 |
| 5,018,703 | A | * | 5/1991 | Goode | .................... F16K 47/08 137/625.3 |

(Continued)

FOREIGN PATENT DOCUMENTS

| CH | 268628 A | 5/1950 |
| DE | 29801762 U1 | 5/1998 |

OTHER PUBLICATIONS

International Search Report for PCT/US2018/047142 dated Nov. 28, 2018.
Written Opinion for PCT/US2018/047142 dated Nov. 28, 2018.

*Primary Examiner* — Umashankar Venkatesan
(74) *Attorney, Agent, or Firm* — Marshall, Gerstein & Borun LLP

(57) ABSTRACT

A valve body has in inlet, an outlet, and a port positioned between the inlet and outlet. An approach passage interconnects the inlet and the port and has a cross-sectional area that is greater than that of the port. One or more guide vanes are positioned within the approach passage and extend longitudinally along at least a portion of the approach passage so that a downstream end of the guide vanes is spaced apart from the port and the guide vanes divide the portion of the approach passage into sub-passages that have equal flow resistances.

7 Claims, 3 Drawing Sheets

(56) References Cited

U.S. PATENT DOCUMENTS

| | | | |
|---|---|---|---|
| 5,531,484 A | 7/1996 | Kawano | |
| 6,439,540 B1* | 8/2002 | Tse | F02D 9/02 |
| | | | 251/118 |
| 8,251,406 B2 | 8/2012 | Kawano | |
| 9,097,364 B2 | 8/2015 | Lovell | |
| 2010/0270491 A1* | 10/2010 | Faas | F16J 15/16 |
| | | | 251/366 |
| 2011/0241334 A1 | 10/2011 | Kawano | |
| 2014/0061528 A1* | 3/2014 | Davies | F16K 47/00 |
| | | | 251/366 |
| 2015/0300525 A1* | 10/2015 | Lin | F16L 55/02718 |
| | | | 181/247 |
| 2016/0084246 A1 | 3/2016 | Dole et al. | |

* cited by examiner

CONTROL VALVE WITH GUIDE VANE

FIELD OF THE DISCLOSURE

This disclosure relates generally to control valves and, more particularly, to control valves having valve bodies with guide vanes.

BACKGROUND

In control valve design, it is beneficial to have valve body designs that is are as compact as possible. Compact valve body design keeps the required valve body material at a minimum and allows for significantly less expensive control valve design.

Usually, the diameter of the port between the inlet and outlet of the valve body of the control valve is the guiding dimension for the rest of the design and, typically, the cross-sectional area of the port is kept as large as possible. In addition, for control valves having expanding flows, the gallery passage (passageway downstream of the port) is kept as large as possible, which means that the approach passage (passageway upstream of the port) must be compacted or shortened to keep a compact valve body design and keep the valve body material minimal. When used in applications having low inlet velocities and high pressure drops, shortened and compacted approach passages do not typically present problems since the low velocity flow usually does not create flow separation in the approach passage.

However, when the approach passage is compacted, the direction of the fluid flow through the approach passage is turned abruptly, which introduced problems in applications having high inlet velocities and low pressure drops. For these high velocity, low pressure drop applications, recirculation cells or vortices can be introduced near the port due to the abrupt changes of direction of the fluid flow, which can reduce the effective flow area of the port and results in reduced flow through the control valve, is some cases up to 30%. Typically, the recirculation cells form with rotational axes perpendicular to the fluid flow, however, they can also form with rotational axes parallel to the fluid flow to form a vortex. Recirculation cells and vortices can also cause pressure differentials around the circumference of the valve plugs, which can lead to additional problems such as vibration, flow induced instabilities, and controllability problems. The recirculation cells can also form and break up repeatedly, which constantly changed the fluid flow, which can shake and vibrate the control valve.

BRIEF SUMMARY OF THE DISCLOSURE

In accordance with one exemplary aspect of the present invention, a valve body comprises an inlet, an outlet, and a port positioned between the inlet and the outlet. An approach passage interconnects the inlet and the port and the port has a cross-sectional area that is less than that of the approach passage. A plurality of guide vanes are positioned within the approach passage and extend longitudinally along at least a portion of the approach passage, such that downstream ends of the guide vanes are spaced apart from the port and the guide vanes divide the portion of the approach passage into sub-passages having equal flow resistances.

In further accordance with any one or more of the foregoing exemplary aspects of the present invention, a valve body may further include, in any combination, any one or more of the following preferred forms.

In one preferred form, the sub-passages have equal cross-sectional areas.

In another preferred form, the plurality of guide vanes are parallel and each guide vane extends across the approach passage.

In another preferred form, the plurality of guide vanes comprise a first guide vane extending across the approach passage and a second guide vane extending across the approach passage, the second guide vane perpendicular to the first guide vane.

In another preferred form, the plurality of guide vanes comprise a first guide vane extending across the approach passage and a second guide vane extending between the first guide vane and a surface of the approach passage, the second guide vane extending perpendicular to the first guide vane.

In another preferred form, the plurality of guide vanes each extend radially across the approach passage and each guide vane is angularly offset from adjacent guide vanes.

In another preferred form, the approach passage comprises a linear first portion adjacent the inlet, a linear second portion adjacent the port, and an arcuate third portion between the first portion and the second portion. The plurality of guide vanes extend longitudinally from a first end of the third portion, adjacent the first portion, to a second end of the third portion, adjacent the second portion.

In another preferred form, the approach passage comprises at least one of a cross-sectional area that is constant between the inlet and the port or a cross-sectional area that decreases from the inlet to the port.

In another preferred form, each of the plurality of guide vanes comprises a replaceable tip removeably attached to an upstream end of the respective guide vane.

In another preferred form, a surface of at least one of the plurality of guide vanes comprises at least one of a wear indicator, an erosion indicator, a cavitation indicator, or a debris scavenger to collect or deflect debris in the inlet passage.

In another preferred form, a control valve includes the valve body, a valve seat, a valve plug, and a cage. The valve seat is positioned in the port of the valve body. The valve plug is positioned within the valve body and is movable between a closed position, in which the valve plug sealingly engages the valve seat, and an open position, in which the valve plug is spaced away from the valve seat. The cage is disposed within the valve body adjacent the valve seat and proximate the valve plug to provide guidance for the valve plug.

In accordance with another exemplary aspect of the present invention, a valve body comprises an inlet, an outlet, and a port positioned between the inlet and the outlet. An approach passage interconnects the inlet and the port and the port has a cross-sectional area that is less than that of the approach passage. A guide vane is positioned within the approach passage and extends radially across the approach passage and longitudinally along at least a portion of the approach passage, such that a downstream end of the guide vane is spaced apart from the port and the guide vane divides the portion of the approach passage into two sub-passages having equal flow resistances.

In further accordance with any one or more of the foregoing exemplary aspects of the present invention, a valve body may further include, in any combination, any one or more of the following preferred forms.

In one preferred form, the sub-passages have equal cross-sectional areas.

In another preferred form, the approach passage comprises a linear first portion adjacent the inlet, a linear second portion adjacent the port, and an arcuate third portion between the first portion and the second portion. The guide vane extends longitudinally from a first end of the third portion, adjacent the first portion, to a second end of the third portion, adjacent the second portion.

In another preferred form, the approach passage comprises at least one of a cross-sectional area that is constant between the inlet and the port or a cross-sectional area that decreases from the inlet to the port.

In another preferred form, a replaceable tip is removeably attached to an upstream end of the guide vane and a surface of the guide vane comprises at least one of a wear indicator, an erosion indicator, a cavitation indicator, or a debris scavenger to collect or deflect debris in the approach passage.

In another preferred form, a control valve includes the valve body, a valve seat, a valve plug, and a cage. The valve seat is positioned in the port of the valve body. The valve plug is positioned within the valve body and is movable between a closed position, in which the valve plug sealingly engages the valve seat, and an open position, in which the valve plug is spaced away from the valve seat. The cage is disposed within the valve body adjacent the valve seat and proximate the valve plug to provide guidance for the valve plug.

In accordance with another exemplary aspect of the present invention, a valve body comprises an inlet, an outlet, and a port positioned between the inlet and the outlet. An approach passage interconnects the inlet and the port and the port has a cross-sectional area that is less than a cross-sectional area of the approach passage. A means for dividing the approach passage into a plurality of sub-passages is spaced apart from the port and the flow resistance of each sub-passage is equal.

In further accordance with any one or more of the foregoing exemplary aspects of the present invention, a valve body may further include, in any combination, any one or more of the following preferred forms.

In one preferred form, the means for dividing the approach passage comprises at least one guide vane positioned within the approach passage, the guide vane extending across the approach passage and longitudinally along at least a portion of the approach passage.

In another preferred form, a control valve includes the valve body, a valve seat, a valve plug, and a cage. The valve seat is positioned in the port of the valve body. The valve plug is positioned within the valve body and is movable between a closed position, in which the valve plug sealingly engages the valve seat, and an open position, in which the valve plug is spaced away from the valve seat. The cage is disposed within the valve body adjacent the valve seat and proximate the valve plug to provide guidance for the valve plug.

DETAILED DESCRIPTION

The control valves and control valve bodies shown and described herein reduce/eliminate the formation of recirculation cells and vortices at the port and in the gallery in high velocity/low pressure drop applications by positioning one or more guide vanes in the approach passage. The guide vane(s) divides the fluid flow in the approach passage into two or more sub-passages and help to direct the fluid flow through the control valve. By dividing the fluid flow into multiple sub-passages, the guide vane(s) prevents momentum forces from forcing the flow to against one side of the approach passage, which results in more of the approach passage and port being used and results in an increase of fluid flow through the control valve. Additionally, the more even flow distribution through the valve trim can improve the distribution of pressure around the circumference of the trim and lead to more stable and controlled flow.

Therefore, a more compact valve body with abrupt direction changes in the approach passage can be used for high velocity/low pressure drop applications without the formation of recirculation cells and/or vortices, which allows for the use of smaller and less expensive valve body and control valve designs for use in these types of applications while obtaining the same valve performance. In addition, the increase in flow capacity allows the control valve to be designed with smaller flow ports and internal trim. Therefore, the opening of the control valve, bolting, actuator, control valve face-to-face, etc. may be smaller, which leads to a less expensive control valve design.

Figure 1:
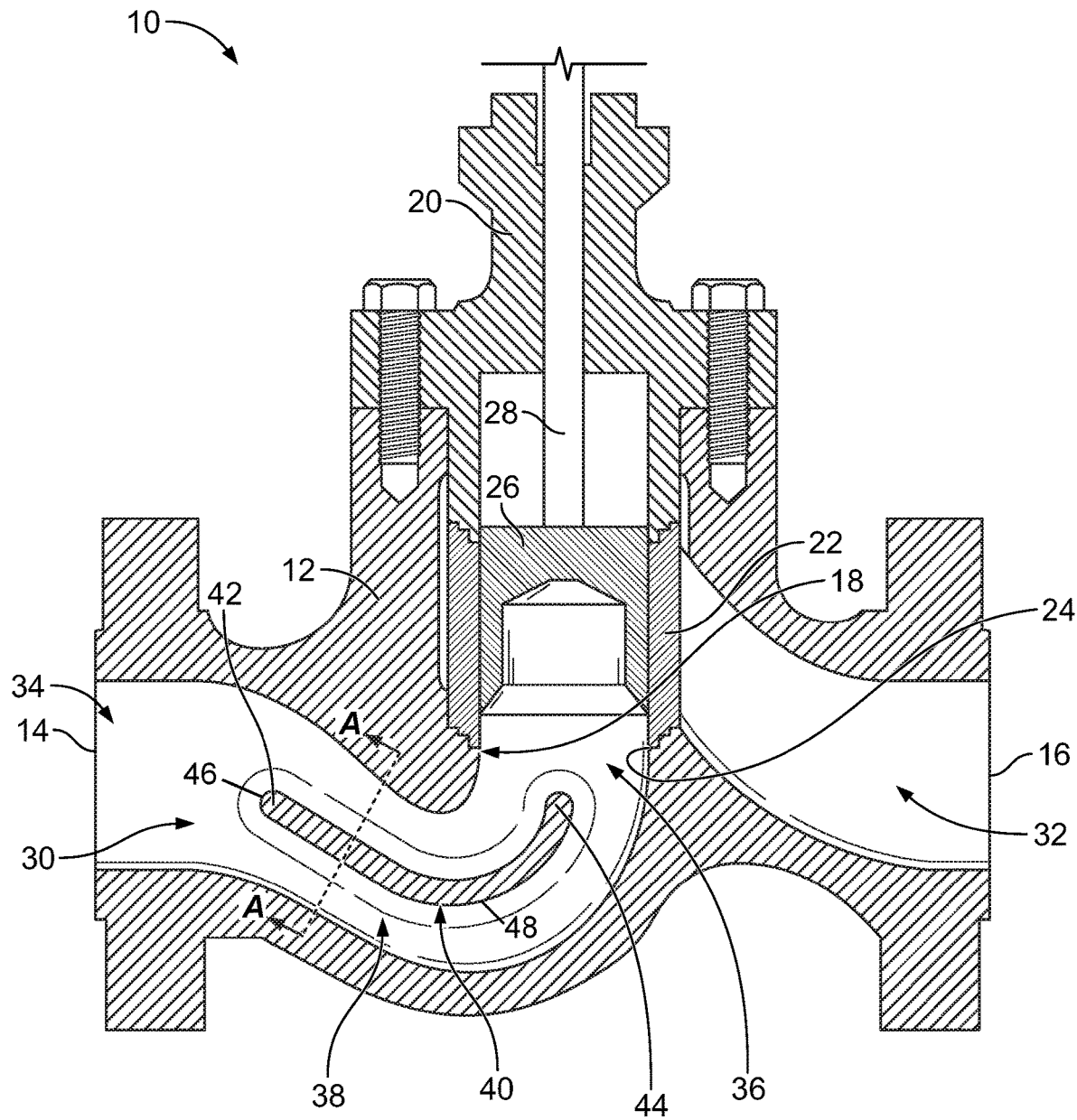
FIG. 1 is a partial cross-sectional view of an example control valve.
Figure 2:
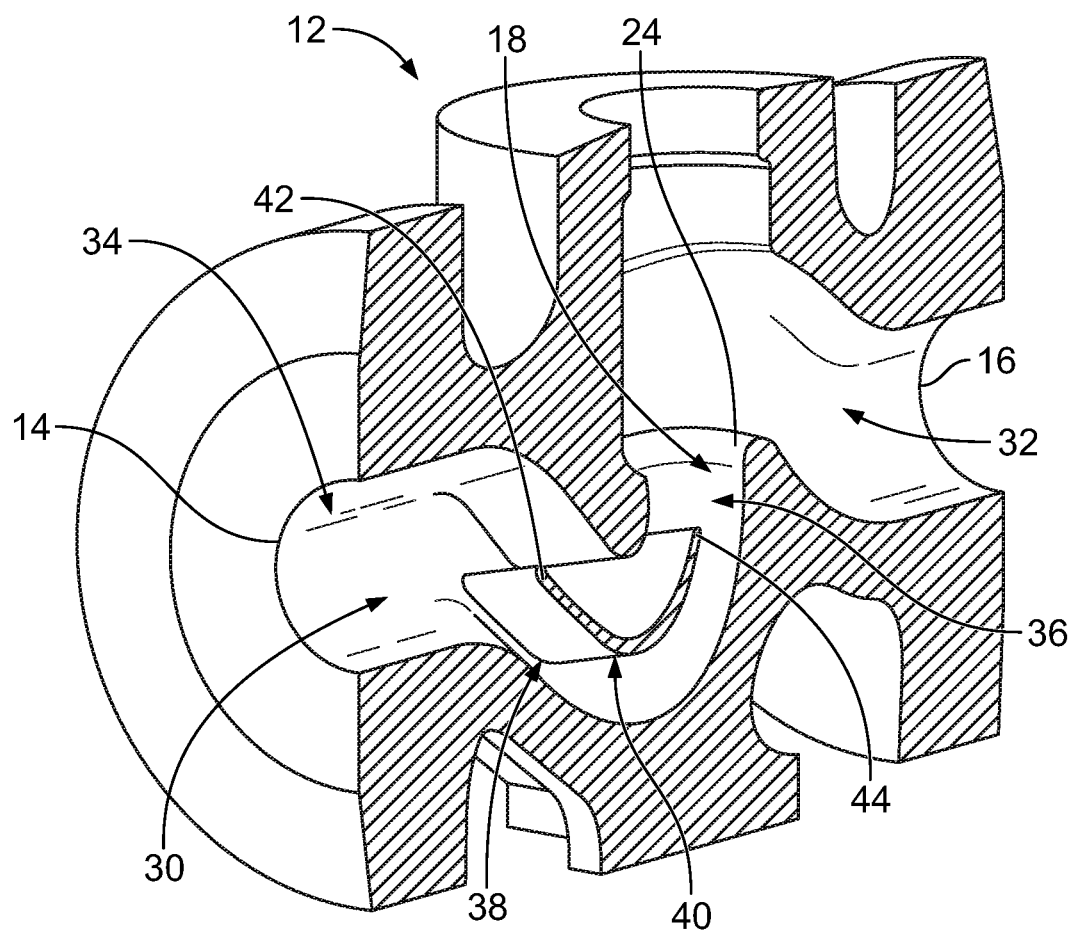
FIG. 2 is a perspective cross-sectional view of the valve body of the control valve of FIG. 1.
Figure 3:
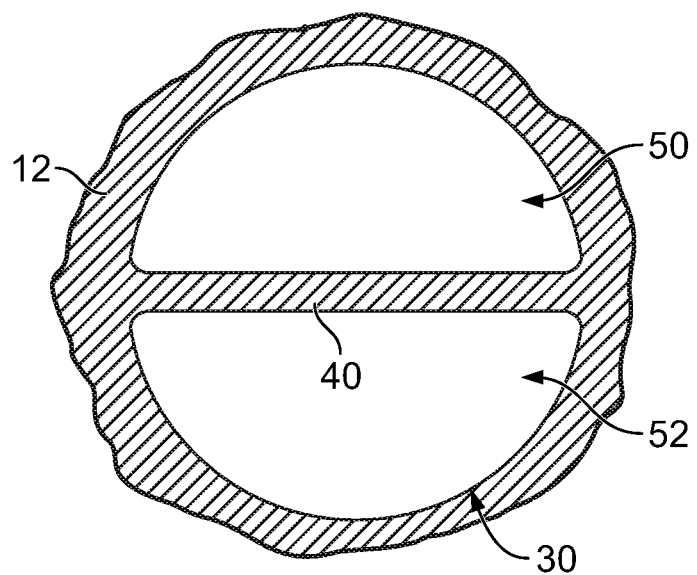
FIG. 3 is a cross-sectional view of a portion of the valve body of the control valve of FIG. 1 taken along line A-A of FIG. 1.

Referring to FIGS. 1-3, an example control valve 10 is shown. Control valve 10 generally includes a valve body 12 having an inlet 14, an outlet 16, and a port 18 disposed between inlet 14 and outlet 16. An approach passage 30 interconnects inlet 14 and port 18 and port 18 preferably has a cross-sectional area that is less than a cross-sectional area of approach passage 30. The cross-sectional area of approach passage 30 can be constant between inlet 14 and port 18 or can decrease from inlet 14 to port 18. A gallery passage 32 also interconnects port 18 and outlet 16. A valve seat 24 is positioned or formed in port 18 between inlet 14 and outlet 16 and a cage 22 is disposed within valve body 12 adjacent valve seat 24. A fluid control member, such as valve plug 26, is positioned within valve body 12 and is disposed within cage 22. Valve plug 26 interacts with valve seat 24 to control fluid flow through the valve body 12 and is movable between a closed position, such that valve plug 26 sealingly engages valve seat 24, and an open position, such that valve plug 26 is spaced away from valve seat 24. A stem 28 is connected to valve plug 26 at one end and to an actuator (now shown) at another end and extends through a bonnet 20, which is secured to valve body 12. The actuator controls movement of valve plug 26 within cage 22. Cage 22 is positioned proximate or adjacent to valve plug 26, and in the example shown cage 22 surrounds valve plug 26, to provide guidance for valve plug 26.

In the particular example shown in FIGS. 1-3, a guide vane 40 is positioned in approach passage 30 and extends radially across approach passage 30, between surfaces of approach passage 30. However, guide vane 40 could also be offset from a longitudinal axis of approach passage 30. Guide vane 40 can be a cast in feature, can be incorporated into the design of the control valve using additive manufacturing, or can be welded in or otherwise secured within approach passage 30. However, guide vane 40 should extend all the way between inner surfaces of approach passage 30. Guide vane 40 has an upstream end 42 and a downstream end 44 that is spaced apart from port 18 and extends longitudinally along at least a portion of approach passage 30 to divide the portion of approach passage 30 into two sub-passages 50, 52 (see FIG. 3) having equal flow resistances. In the example shown in FIGS. 1-2, approach passage 30 has a generally linear first portion 34 that is adjacent inlet 14, a generally linear second portion 36 that is adjacent port 18 and can be perpendicular to first portion 34, and an arcuate third portion 38 positioned between and interconnecting first portion 34 and second portion 36. As shown in this example, guide vane 40 extends longitudinally from a first end of third portion 38, adjacent first portion 34, to a second end of third portion 38, adjacent second portion 36.

In the example shown, sub-passages 50, 52 also have equal cross-sectional areas, although this may not necessarily be required in all designs to obtain equal flow resistances in sub-passages 50, 52.

Additional features can also be incorporated into guide vane 40, if desired for a particular application. For example, a replaceable tip can be removably attached to upstream end 42 of guide vane 40 so that the tip can be replaced if worn or damaged or tips of different shapes, sizes, materials, etc. can be used for different applications. In addition, one or more features could be included on a surface of guide vane 40, such as a wear indicator, an erosion indicator, a cavitation indicator, and/or a debris scavenger to collect or deflect debris in approach passage 30.

Alternatively, instead of using only a single guide vane 40 as shown in FIGS. 1-3, multiple guide vanes could be used in the control valve 10 and valve body 12 of FIGS. 1 and 2, as shown in the example of FIGS. 4-7.

Figure 4:
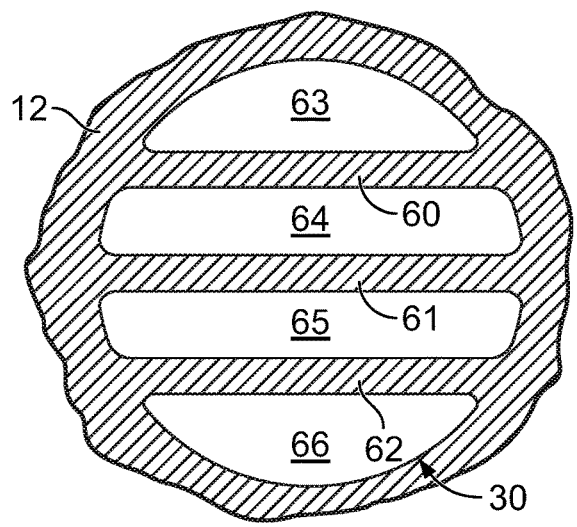
FIG. 4 is the cross-sectional view of FIG. 3 with an alternative guide vane arrangement.

For example, as shown in FIG. 4, a plurality of guide vanes 60, 61, 62 could be positioned within approach passage 30. Guide vanes 60, 61, 62 can be a cast in features, can be incorporated into the design of the control valve using additive manufacturing, or can be welded in or otherwise secured within approach passage 30. However, guide vanes 60, 61, 62 should extend all the way between inner surfaces of approach passage 30. Like guide vane 40, each guide vane 60, 61, 62 has an upstream end and a downstream end that is spaced apart from port 18 and extends longitudinally along at least a portion of approach passage 30 to divide the portion of approach passage 30 into multiple sub-passages 63, 63, 65, 66 having equal flow resistances. In this particular example, guide vanes 60, 61, 62 are parallel and extend across approach passage 30, between surfaces of approach passage 30.

In the example shown, sub-passages 63, 64, 65, 66 could also have equal cross-sectional areas, although this may not necessarily be required in all designs to obtain equal flow resistances in sub-passages 63, 64, 65, 66.

Figure 5:
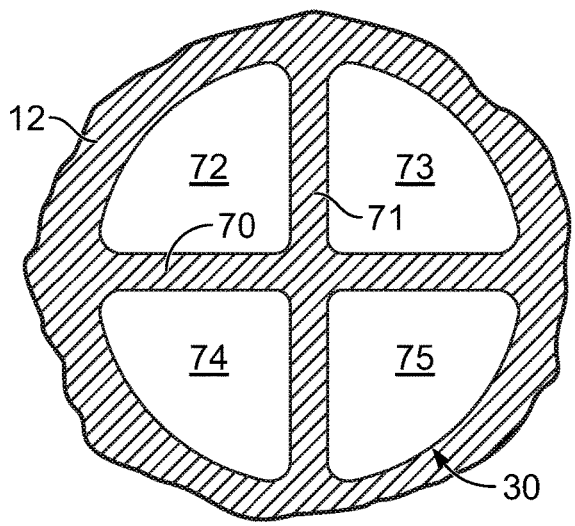
FIG. 5 is the cross-sectional view of FIG. 3 with another alternative guide valve arrangement.

In addition, as shown in FIG. 5, first and second guide vanes 70, 71 can be positioned within approach passage 30. Guide vanes 70, 71 can be a cast in features, can be incorporated into the design of the control valve using additive manufacturing, or can be welded in or otherwise secured within approach passage 30. However, guide vanes 70, 71 should extend all the way between inner surfaces of approach passage 30. Like guide vane 40, each guide vane 70, 71 has an upstream end and a downstream end that is spaced apart from port 18 and extends longitudinally along at least a portion along at least a portion of approach passage 30 to divide the portion of approach passage 30 into multiple sub-passages 72, 73, 74, 75 having equal flow resistances. In this particular example, first guide vane 70 extends generally radially across approach passage 30, between surfaces of approach passage 30. Similarly, second guide vane 71 extends generally radially across approach passage 30, between surfaces of approach passage 30, and is positioned perpendicular to first guide vane 70.

In the example shown, sub-passages 72, 73, 74, 75 could also have equal cross-sectional areas, although this may not necessarily be required in all designs to obtain equal flow resistances in sub-passages 72, 73, 74, 75.

Figure 6:
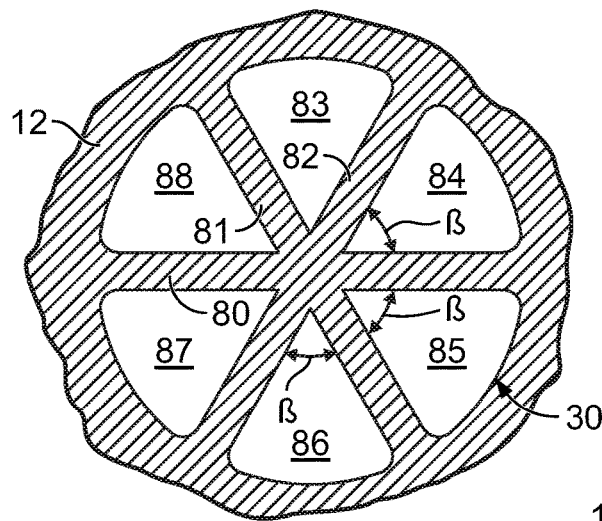
FIG. 6 is the cross-sectional view of FIG. 3 with another alternative guide valve arrangement.

Referring to FIG. 6, multiple guide vanes 80, 81, 82 can be positioned with approach passage 30. Guide vanes 80, 81, 82 can be a cast in feature, can be incorporated into the design of the control valve using additive manufacturing, or can be welded in or otherwise secured within approach passage 30. However, guide vanes 80, 81, 82 should extend all the way between inner surfaces of approach passage 30. Like guide vane 40, each guide vane 80, 81, 82 has an upstream end and a downstream end that is spaced apart from port 18 and extends longitudinally along at least a portion along at least a portion of approach passage 30 to divide the portion of approach passage 30 into multiple sub-passages 83, 84, 85, 86, 87, 88 having equal flow resistances. In this particular example, each guide vane 80, 81, 82 extends generally radially across approach passage 30, between surfaces of approach passage 30, and is angularly offset from adjacent guide vanes by an angle $\beta$.

In the example shown, sub-passages 83, 84, 85, 86, 87, 88 could also have equal cross-sectional areas, although this may not necessarily be required in all designs to obtain equal flow resistances in sub-passages 83, 84, 85, 86, 87, 88.

Figure 7:
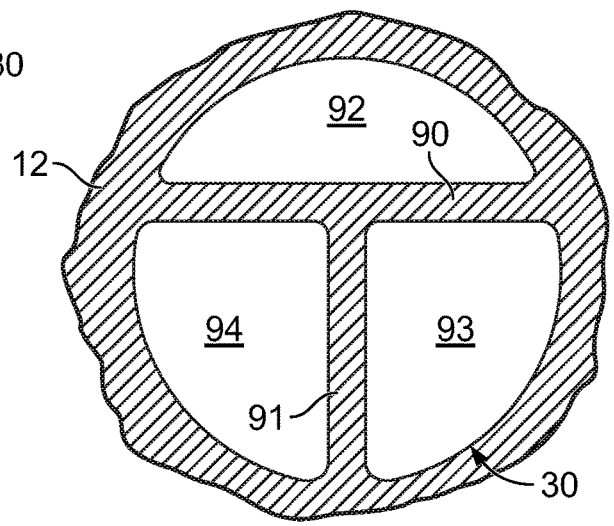
FIG. 7 is the cross-sectional view of FIG. 3 with another alternative guide valve arrangement.

As shown in FIG. 7, first and second guide vanes 90, 91 can be positioned within approach passage 30. Like guide vane 40, each guide vane 90, 91 has an upstream end and a downstream end that is spaced apart from port 18 and extends longitudinally along at least a portion along at least a portion of approach passage 30 to divide the portion of approach passage 30 into multiple sub-passages 92, 93, 94 having equal flow resistances. In this particular example, first guide vane 90 extends across approach passage 30, between surfaces of approach passage 30. Second guide vane 91 extends between first guide vane 90 and a surface of approach passage 30 and is positioned perpendicular to first guide vane 90. Guide vanes 90, 91 can be a cast in feature, can be incorporated into the design of the control valve using additive manufacturing, or can be welded in or otherwise secured within approach passage 30. However, guide vane 90 should extend all the way between inner surfaces of approach passage 30 and guide vane 91 should extend all the way between guide vane 90 and the inner surface of approach passage 30.

In the example shown, sub-passages 92, 93, 94 could also have equal cross-sectional areas, although this may not necessarily be required in all designs to obtain equal flow resistances in sub-passages 92, 93, 94.

As described above for the example of FIGS. 1-3, in the examples shown in FIGS. 4-7, approach passage 30 has a generally linear first portion 34 that is adjacent inlet 14, a generally linear second portion 36 that is adjacent port 18 and can be perpendicular to first portion 34, and an arcuate third portion 38 positioned between and interconnecting first portion 34 and second portion 36. Guide vanes 60, 61, 62, 70, 71, 80, 81, 82, 90, 91 extend longitudinally from a first end of third portion 38, adjacent first portion 34, to a second end of third portion 38, adjacent second portion 36.

Additional features can also be incorporated into guide vanes 60, 61, 62, 70, 71, 80, 81, 82, 90, 91, if desired for a particular application. For example, a replaceable tip can be removably attached to the upstream end of one or more guide vanes 60, 61, 62, 70, 71, 80, 81, 82, 90, 91 so that the tip can be replaced if worn or damaged or tips of different shapes, sizes, materials, etc. can be used for different applications. In addition, one or more features could be included on a surface of one or more guide vanes 60, 61, 62, 70, 71, 80, 81, 82, 90, 91, such as a wear indicator, an erosion indicator, a cavitation indicator, and/or a debris scavenger to collect or deflect debris in approach passage 30.

As described above, a single guide vane (FIG. 3) or multiple guide vanes (FIGS. 4-7) could be used to divide approach passage 30 into multiple sub-passages, as long as the downstream ends of the guide vanes are spaced apart from the port 18 and the flow resistances are balanced so that the flow resistance of each sub-passage is equal. Regardless of the number of guide vanes used or the particular orientation of each guide vane, spacing the downstream ends of the guide vanes from the port and providing roughly equal flow resistances for each sub-passage maintains stable flow conditions when fluid flow streams combine at the downstream end of the guide vane(s), mitigates or eliminates flow separation as the fluid flow approaches the port, especially with high velocity fluid flow, and prevents recirculation cells from being formed upstream of the port without reducing area of the port available for fluid flow. In addition, spacing the downstream ends of the guide vanes apart from the port prevents the guide vanes from reducing the cross sectional area of the port, which can reduce the fluid flow through the port. This can allow the use of a smaller control valve with the flow rate of a larger control valve, which can reduce the cost.

While various embodiments have been described above, this disclosure is not intended to be limited thereto. Variations can be made to the disclosed embodiments that are still within the scope of the appended claims.

What is claimed is:

1. A valve body, comprising:
    an inlet, an outlet, and a port positioned between the inlet and the outlet;
    an approach passage interconnecting the inlet and the port, the approach passage comprising a linear first portion adjacent the inlet, a linear second portion adjacent the port, and an arcuate third portion between the first portion and the second portion; and
    a guide vane positioned within the approach passage, the guide vane extending radially across the approach passage and longitudinally along the third portion of the approach passage from the first portion to the second portion, such that the guide vane divides the third portion of the approach passage into two sub-passages having equal flow resistances; wherein
        a cross-sectional area of the port is less than a cross-sectional area of the approach passage; and
        a downstream end of the guide vane is spaced apart from the port.

2. The valve body of claim 1, wherein the sub-passages have equal cross-sectional areas.

3. The valve body of claim 1, wherein the approach passage comprises at least one of a cross-sectional area that is constant between the inlet and the port or a cross-sectional area that decreases from the inlet to the port.

4. A control valve including the valve body of claim 1, the control valve comprising:
    a valve seat positioned in the port of the valve body;
    a valve plug positioned within the valve body and movable between a closed position, in which the valve plug sealingly engages the valve seat, and an open position, in which the valve plug is spaced away from the valve seat; and
    a cage disposed within the valve body adjacent the valve seat and surrounding the valve plug to provide guidance for the valve plug.

5. A control valve, comprising:
    a valve body, comprising:
        an inlet, an outlet, and a port positioned between the inlet and the outlet;
        an approach passage interconnecting the inlet and the port, the approach passage comprising a linear first portion adjacent the inlet, a linear second portion adjacent the port, and an arcuate third portion between the first portion and the second portion; and
        a means for dividing the third portion of the approach passage into a plurality of sub-passages, each sub-passage having a flow resistance; wherein
            the means for dividing the approach passage extends longitudinally along the third portion of the approach passage from the first portion to the second portion;
            the flow resistances of the sub-passages are equal;
            a cross-sectional area of the port is less than a cross-sectional area of the approach passage; and
            the means for dividing the approach passage is spaced apart from the port;
    a valve seat positioned in the port of the valve body;
    a valve plug positioned within the valve body and movable by a stem connected to the valve plug between a closed position, in which the valve plug sealingly engages the valve seat, and an open position, in which the valve plug is spaced away from the valve seat; and
    a cage disposed within the valve body proximate the valve seat and surrounding the valve plug to provide guidance for the valve plug.

6. The control valve of claim 5, wherein the means for dividing the approach passage comprises at least one guide vane positioned within the approach passage, the guide vane extending across the approach passage and longitudinally along at least a portion of the approach passage.

7. The control valve of claim 5, wherein the approach passage comprises at least one of a cross-sectional area that is constant between the inlet and the port or a cross-sectional area that decreases from the inlet to the port.

* * * * *

UNITED STATES PATENT AND TRADEMARK OFFICE
CERTIFICATE OF CORRECTION

PATENT NO. : 10,935,161 B2
APPLICATION NO. : 15/708735
DATED : March 2, 2021
INVENTOR(S) : Kenneth W. Junk et al.

Page 1 of 1

It is certified that error appears in the above-identified patent and that said Letters Patent is hereby corrected as shown below:

On the Title Page

Item (57), Line 1, "in" should be -- an --.

In the Specification

At Column 1, Line 13, "is are" should be -- are --.

At Column 1, Line 39, "is" should be -- in --.

At Column 5, Line 50, "63, 63," should be -- 63, 64, --.

Signed and Sealed this
Fifth Day of October, 2021

Drew Hirshfeld
*Performing the Functions and Duties of the
Under Secretary of Commerce for Intellectual Property and
Director of the United States Patent and Trademark Office*